(12) United States Patent
Bodemann

(10) Patent No.: US 9,700,746 B2
(45) Date of Patent: Jul. 11, 2017

(54) GAS PURGING VALVE FOR FIRE PROTECTION SYSTEM

(71) Applicant: South-Tek Systems, LLC, Wilmington, NC (US)

(72) Inventor: Timothy S. Bodemann, Wilmington, NC (US)

(73) Assignee: South-Tek Systems, LLC, Wilmington, NC (US)

( * ) Notice: Subject to any disclaimer, the term of this patent is extended or adjusted under 35 U.S.C. 154(b) by 0 days.

(21) Appl. No.: 14/982,617

(22) Filed: Dec. 29, 2015

(65) Prior Publication Data
US 2016/0129291 A1    May 12, 2016

Related U.S. Application Data

(60) Continuation-in-part of application No. 14/277,366, filed on May 14, 2014, now Pat. No. 9,242,131.
(Continued)

(51) Int. Cl.
*A62C 35/00* (2006.01)
*A62C 35/68* (2006.01)
(Continued)

(52) U.S. Cl.
CPC .............. *A62C 35/68* (2013.01); *A62C 35/62* (2013.01); *G01M 3/22* (2013.01); *G01M 3/2815* (2013.01);
(Continued)

(58) Field of Classification Search
CPC ................. F16K 31/44; Y10T 37/0419; Y10T 137/7722; Y10T 137/7897
(Continued)

(56) References Cited

U.S. PATENT DOCUMENTS 3,580,072 A * 5/1971 Cox .......................... G01F 1/74
                                                    73/861.03
3,782,363 A * 1/1974 Davis ..................... A61B 10/00
                                                    137/253
(Continued)

FOREIGN PATENT DOCUMENTS

WO       2011162988 A2    12/2011

OTHER PUBLICATIONS

Emerson 'Tescom' Basics of Pressure Regulation. Documentation. emersonprocess.com. Retrieved Dec. 6, 2016, from http://www.documentation.emersonprocess.com/groups/public/documents/bulletins/debul2008x012.pdf.*
(Continued)

*Primary Examiner* — Justin Jonaitis
(74) *Attorney, Agent, or Firm* — Coats & Bennett, PLLC

(57) ABSTRACT

A gas purging valve is operative to be connected to piping in a Fire Protection System (FPS) and to bleed gas at a predetermined rate. The valve includes an inlet in gas flow relationship with the FPS piping and a central passage in gas flow relationship with the inlet. The valve also includes a calibrated orifice removeably disposed in the central passage, in gas flow relationship with the passage and operative to allow a maximum predetermined gas flow rate therethrough. The valve further includes an outlet in gas flow relationship with the calibrated orifice. A ball is disposed upstream of the central passage. The ball is operative to allow gas flow through the gas purging valve but operative to impede the flow of water through the gas purging valve.

20 Claims, 6 Drawing Sheets

Related U.S. Application Data which is a division of application No. 12/718,653, filed on Mar. 5, 2010, now abandoned.

(60) Provisional application No. 61/169,974, filed on Apr. 16, 2009.

(51) Int. Cl.
*A62C 35/62* (2006.01)
*G01M 3/28* (2006.01)
*G01M 3/22* (2006.01)

(52) U.S. Cl.
CPC .... *Y10T 137/0419* (2015.04); *Y10T 137/7722* (2015.04); *Y10T 137/7897* (2015.04)

(58) Field of Classification Search
USPC ......... 137/329.3; 251/82, 83, 66, 67, 72, 73, 251/12; 169/43, 17, 11
See application file for complete search history.

(56) References Cited

U.S. PATENT DOCUMENTS

| | | | | |
|---|---|---|---|---|
| 3,844,940 | A | * | 10/1974 | Kopf ..................... A61M 1/16 205/792 |
| 4,527,587 | A | | 7/1985 | Fairlamb |
| 4,640,304 | A | * | 2/1987 | Looney ................ F16K 24/046 137/202 |
| 5,578,115 | A | | 11/1996 | Cole |
| 6,960,321 | B1 | * | 11/2005 | Ludwig ..................... A61L 2/07 134/18 |
| 2006/0283877 | A1 | | 12/2006 | Bodemann |
| 2010/0065287 | A1 | | 3/2010 | Burkhart et al. |
| 2011/0094758 | A1 | * | 4/2011 | Burkhart ................ A62C 35/62 169/17 |
| 2011/0226495 | A1 | * | 9/2011 | Burkhart ................ A62C 35/62 169/16 |

OTHER PUBLICATIONS

"Series ARV Thermoplastic Air Release Valve," Sep. 23, 2004, Plast-O-Matic Valves Inc. www.plastomatic.com/arv.html.

* cited by examiner

GAS PURGING VALVE FOR FIRE PROTECTION SYSTEM

CROSS-REFERENCE TO RELATED APPLICATIONS

This application is a continuation-in-part filing of U.S. patent application Ser. No. 14/277,366, titled "Gas Purging Valve for Fire Protection System", filed May 14, 2014, which is a divisional filing of U.S. patent application Ser. No. 12/718,653, titled "System and Method for Fire Protection System Corrosion Mitigation," filed Mar. 5, 2010, which claims priority to U.S. Provisional Patent Application Ser. No. 61/169,974, titled, "The MICBlast™—Corrosion Inhibiting System for Fire Protection Systems (FPS)," filed Apr. 16, 2009, the disclosures of all of which are incorporated herein by reference in their entireties.

FIELD OF THE INVENTION

The present invention relates generally to fire protection systems (FPS), and in particular to a gas purging valve operative to bleed inert gas from an FPS at a predetermined rate.

BACKGROUND

Fire sprinkler systems are a well-known type of active fire suppression system. Sprinklers are installed in all types of buildings, commercial and residential, and are generally required by fire and building codes for buildings open to the public. Typical sprinkler systems comprise a network of pipes, usually located at ceiling level, that are connected to a reliable water source. Sprinkler heads are disposed along the pipes at regular intervals. Each sprinkler head includes a fusible element, or a frangible glass bulb, that is heat-sensitive and designed to fail at a predetermined temperature. Failure of the fusible element or glass bulb opens an orifice, allowing water to flow through the head, where it is directed by a deflector into a predetermined spray pattern. Sprinkler systems may suppress a fire, or inhibit its growth, thereby saving lives and limiting inventory loss and structural damage. Sprinkler specifications are published by the National Fire Protection Association (e.g., NFPA 13, 13D, 13R).

The sprinkler system (more generally, Fire Protection System, or FPS) is fed from a pump room or riser room. In a large building the FPS consist of several "zones," each being fed from a riser in the pump room. The riser contains the main isolation valve and other monitoring equipment (e.g., flow switches, alarm sensors, and the like). The riser is typically a 6 or 8 inch diameter pipe coupled through a booster pump (called the fire pump) to the main water supply to the building. The riser then progressively branches off into smaller "cross mains" and branch lines, also known as "zones". At the furthest point from the riser, typically at the end of each zone, there is an "inspector's test port," which is used for flow testing.

Many FPS are "wet" systems—meaning the sprinkler pipes in each room are full of water under a predetermined "internal set point" pressure. If the water pressure decreases below the set point, valves are opened and/or a pump is activated, and water flows into the sprinkler pipes in an attempt to maintain the pressure. The set point pressure drops when water escapes the system, such as due to the opening of a sprinkler head in a fire. However, the system may also be activated by a broken sprinkler head, or leaks in the system, such as leaks caused by corrosion of the pipes.

Due to the possibility of water discharge in other than actual fire conditions, a wet FPS present an unacceptable risk to sensitive equipment or merchandise in many applications. For example, a data center that houses expensive, mission-critical computing or telecommunications equipment; a semiconductor manufacturing facility; and a warehouse storing high-value, non-waterproof merchandise, are examples of facilities in which a wet FPS would be unacceptable. Also, areas subject to freezing temperatures cannot utilize wet FPS.

To address the need for FPS in areas where a wet FPS is not acceptable, alternatives to the wet FPS have been developed. These are of two general categories. Dry FPS are typically used in areas that are subject to freezing temperatures, where a water-filled system is not practical (e.g., parking garages, non-heated attics of motels and nursing homes, and the like). A dry FPS uses compressed air in the piping as a "supervisory gas." The air is maintained at a supervisory pressure, e.g., approximately 20 PSI. When a sprinkler head opens, the air pressure drops to atmospheric (e.g., 0 PSI), and a valve opens in response to the lower pressure. The valve locks in the open position and water rushes into the system. Dry FPS address the freezing problem, but present the same hazards of loss or damage to expensive equipment or merchandise as wet FPS, if the dry FPS is activated due to sprinkler head damage or failure, or a leak such as from corroded pipes.

Pre-Action FPS, also called a double interlock dry FPS, protects against water damage by increasing the probability that the system is only activated by an actual fire. A pre-action FPS operates similarly to a dry FPS; however, two or more action signals are required before water is injected into the system. A drop in supervisory air pressure alone will not activate the water isolation valve unless a second signal, such as a heat or smoke detector signal, is received by the control panel. At that point the isolation valve will open and water will rush into the zones with the aid of a booster pump called the fire pump.

Both dry and pre-action FPS must be hydro-tested after initial installation to make sure that the piping and hangers can support the additional weight of the water, and to make sure that the flow rate of water through the system conforms to applicable specifications (e.g., the NFPA 13 standard). Once it has passed all the tests, the system is drained and then filled with compressed air (supervisory gas). However, the FPS pipes never drain completely, and the residual water that remains creates ideal conditions for the initiation and propagation of corrosion in the piping either by means of galvanic or organic induced corrosion. Sometimes, microbes can grow in the water and accelerate the corrosion by means of the byproducts that they produce during their metabolic cycle. This is called Microbiologically Influenced Corrosion (MIC). Over time, MIC or galvanic corrosion can cause extensive damage to an FPS, as corrosion-induced leaks cause loss of supervisory gas, either arming (pre-action FPS) or activating (dry FPS) the system. Compressed air is used to maintain the supervisory pressure in both Dry and Pre-Action FPS, and this compressed air provides the oxygen that induces the galvanic corrosion and/or MIC, when the FPS is laden with residual water after draining from the hydrotesting.

It is well known in the art to use an inert gas, such as nitrogen, as a supervisory gas in a dry or pre-action FPS rather than air. The inert gas contains no oxygen, and hence disallows the growth of microbes in the residual water remaining in the FPS pipes. Additionally, the lack of oxygen reduces or eliminates corrosion, which is a form of oxidation. For example, UK Patent No. 1,081,293, titled "Wet and Dry Pipe Sprinkler Systems," filed Nov. 26, 1963, discloses the use of "nitrogen or other chemically inert gas," stating, "By 'chemically inert gas' I mean any gas which is non-corroding to the materials of the system under expected conditions of use; non-limitative examples are nitrogen, and the inert gases such as argon and krypton."

However, aside from oxygen in the air in FPS pipes, oxygen is also chemically dissolved in the residual water in the FPS pipes. That is, the residual water includes O2 molecules, apart from the oxygen bound up in the H2O molecules forming the water itself. As one example, a test of local city water at 60° F. in Charlotte, N.C. revealed an O2 content of 9.617 ppm (parts per million). Due to the partial pressure of gases, O2 from such water will outgas into the N2 in the FPS pipes, providing enough O2 for the onset of detrimental corrosion. Accordingly, simply purging wet FPS pipes with N2 prior to charging the system is not a long-term solution to corrosion.

SUMMARY

According to one or more embodiments described and claimed herein, a gas purging valve is operative to be connected to piping in a Fire Protection System (FPS) and to bleed gas at a predetermined rate. This is to ensure the full FPS piping will be purged with inert gas, hence achieving a predetermined purity of the inert gas, resulting in reducing or eliminating oxygen within the FPS pipes. The valve includes an inlet in gas flow relationship with the FPS piping and a central passage in gas flow relationship with the inlet. The valve also includes a calibrated orifice removeably disposed in the central passage, in gas flow relationship with the passage and operative to allow a maximum predetermined gas flow rate therethrough. The valve further includes an outlet in gas flow relationship with the calibrated orifice. A ball is disposed upstream of the central passage. The ball is operative to allow gas flow through the gas purging valve but operative to impede the flow of water through the gas purging valve.

One embodiment relates to a gas purging valve operative to be connected to piping in a Fire Protection System (FPS) and to bleed gas from the FPS piping at an adjustable rate. The valve includes an inlet in gas flow relationship with the FPS piping and operative to receive pressurized gas from the FPS piping; an adjustable orifice operative to allow an adjustable maximum gas flow rate therethrough; a gas flow monitor operative to measure the rate of gas flow through the adjustable orifice; an outlet operative to discharge gas from the gas purging valve to the atmosphere; and a water restriction mechanism disposed upstream of the adjustable orifice, the water restriction mechanism operative to allow gas flow through the gas purging valve but operative to impede the flow of water through the gas purging valve.

Another embodiment relates to a method of operating a dry or pre-action Fire Protection System (FPS) having a nitrogen generator and a gas purging valve connected thereto. A desired gas flow rate for purging nitrogen gas from the FPS is determined based on the size of the FPS and parameters of the nitrogen generator. An adjustable orifice of the gas purging valve is adjusted to achieve the determined gas flow rate. The gas flow rate through the adjustable orifice is verified by monitoring a gas flow monitor of the gas purging valve.

DETAILED DESCRIPTION

According to embodiments of the present invention, galvanic and MIC corrosion in the pipes of a dry or pre-action Fire Protection System (FPS) are minimized or eliminated by maintaining a high purity, inert gas, such as nitrogen (N2) in the pipes in lieu of the conventional compressed air, to provide supervisory pressure holding a dry pipe valve closed until the FPS system is actuated. To ensure that oxygen does not enter the pipes, such as be being offgassed from O2 dissolved in residual water, and to dry the pipes of residual water over time, the inert gas is periodically or continuously bled from the FPS pipes, and replaced by freshly generated nitrogen, such as from a nitrogen generator attached to the FPS.

Figure 1:
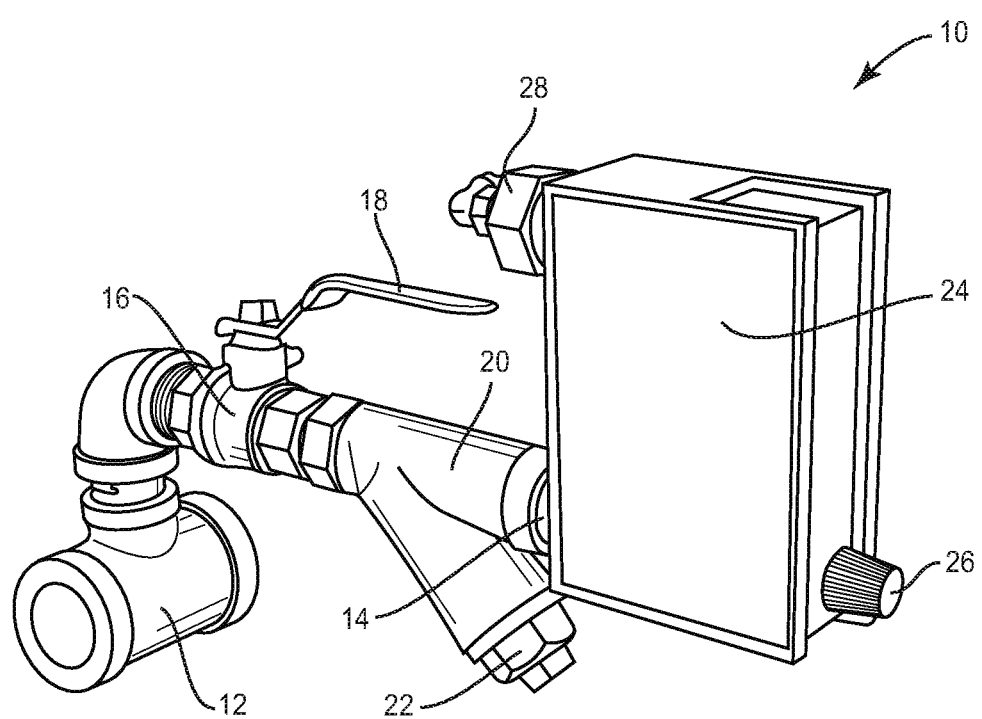
FIG. 1 is a perspective view of a gas purging valve.
Figure 2:
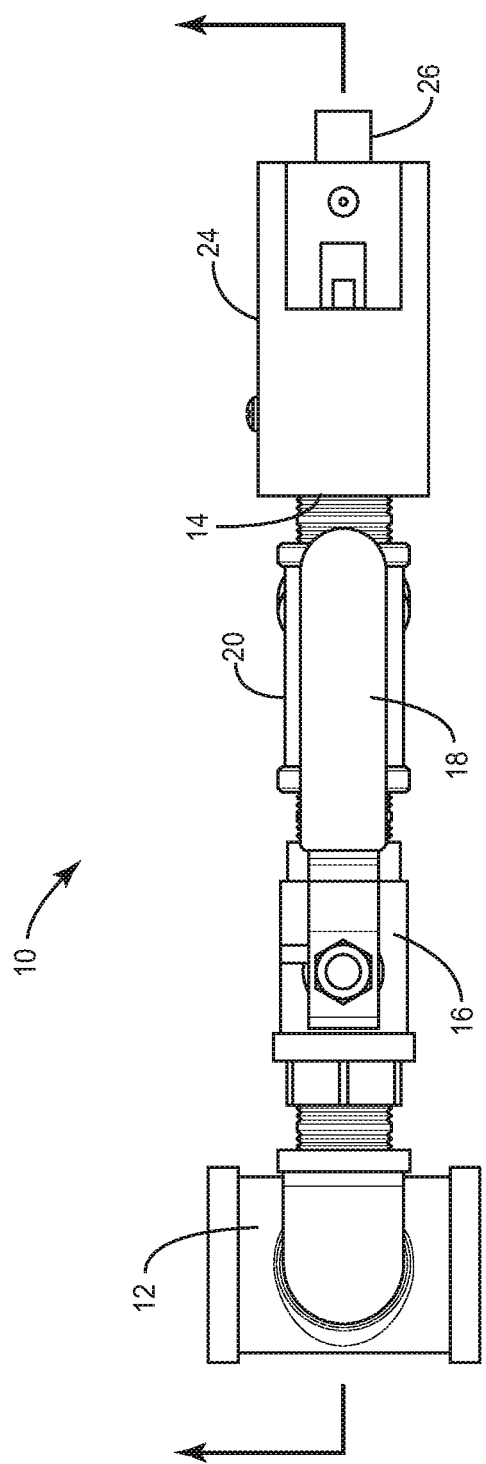
FIG. 2 is a plan view of the valve of FIG. 1.

FIG. 1 is a perspective view, and FIG. 2 a plan view, of a gas purging valve 10 optimized for use in maintaining high-purity inert gas in FPS pipes 12. The gas purging valve 10 attaches to an FPS pipe 12 at a high point. In some embodiments, as depicted in FIGS. 1 and 2, various ports and valves may be interposed between the FPS pipe 12 and the gas purging valve 10. For example, a shut-off valve 16 having a manually-actuated handle 18 isolates the gas purging valve 10 from the FPS pipes 12 during hydro-testing. A "wye" pipe segment 20 provides a by-pass route 22, such as for draining in the event water extends past the shut-off valve 16.

In the embodiment depicted in FIGS. 1 and 2, an integrated auto-purge unit 24 includes an adjustable orifice operative to allow an adjustable maximum gas flow rate through the gas purging valve 10; a gas flow meter operative to measure the rate of gas flow through the adjustable orifice; and a water restriction mechanism operative to allow gas flow through the gas purging valve but operative to impede the flow of water through the gas purging valve 10. A gas flow rate adjustment knob 26 controls the adjustable orifice to regulate the maximum gas flow rate. An outlet 28 vents gas to the atmosphere.

Figure 3:
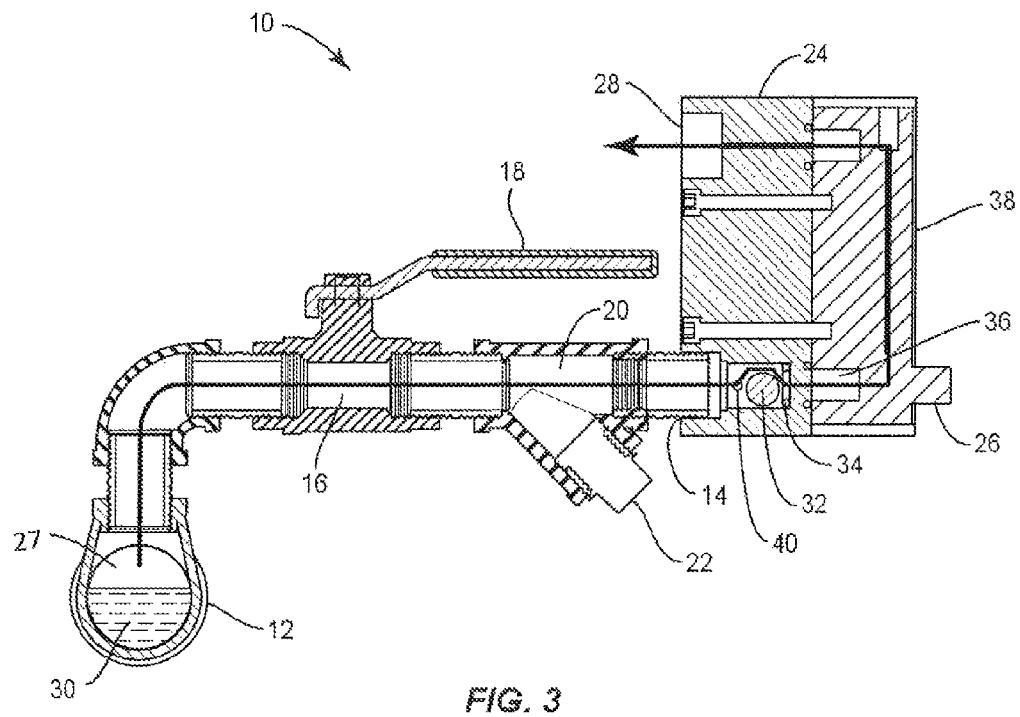
FIG. 3 is a section view of the valve of FIG. 1, taken along the section line shown in FIG. 2, showing gas flow through the valve.

FIG. 3 is a section view of the gas purging valve 10, taken along the section line depicted in FIG. 2, when the water restriction mechanism is not actuated and gas is allowed to flow through the valve 10. Inert gas 27, such as nitrogen, resides in the FPS pipe 12, possibly over residual water 30 that failed to drain following hydro-testing. With the shut-off valve 16 in the open position, the gas flows through the shut-off valve 16 and wye pipe 20 into the inlet 14 of the gas purging valve 10.

In the embodiment depicted in FIG. 3, the water restriction mechanism comprises a ball 32, such as a polyethylene ball. In the absence of water, the ball 32 rests on the floor of the inlet 14 passage, allowing gas to flow around it, as indicated by the directional flow line. The gas flows into an integrated adjustable orifice 36 and gas flow meter 38. The adjustable orifice 36 controls the maximum gas flow rate through the gas purging valve 10 by manual adjustment of a knob 26. In one embodiment, adjustable orifice 36 and flow rate adjustment knob 26 may combine a conventional needle valve, as well known in the art. As the gas flows through the gas flow meter 38, a visual indication of the gas flow rate, such as the height of a floating ball, is visible. In one embodiment, the integrated adjustable orifice 36 and gas flow meter 38 comprises a Thorpe tube flowmeter. As known in the art, a Thorpe tube flowmeter comprises a needle valve 36 controlled by an adjustment knob 26, and a float resting in a clear tapered tube. The height of the float (which may be a ball) in the tube indicates the flow rate. In one embodiment, this flow rate is calibrated and a scale is affixed to the integrated auto-purge unit 24 to facilitate easy reading of the gas flow rate. The gas escapes the gas purging valve 10 through an outlet 28.

Figure 4:
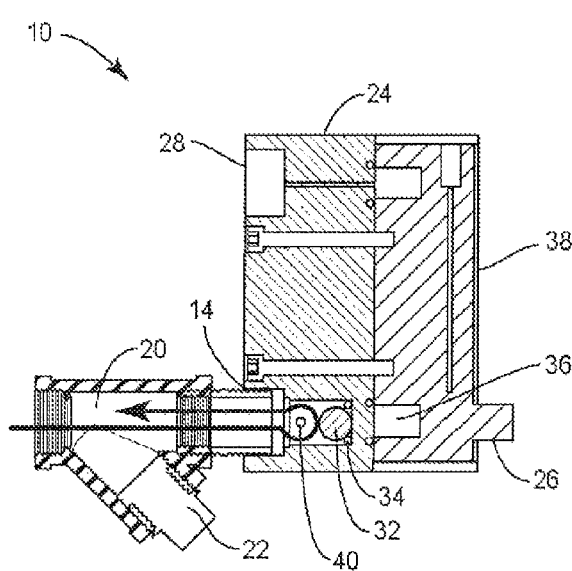
FIG. 4 is a section view showing the blockage of water flow through the valve.

FIG. 4 depicts the gas purging valve 10 when water enters the inlet 14, such as may occur if the shut-off valve 16 were left open during hydro-testing. The pressurized water drives the ball 32 forward, where it seats against an O-ring 34. This seals the integrated auto-purge unit 24 against water incursion, and forces the water back, as indicated by the directional flow line. A water bleed screw 40 allows for the removal of this water, after the shut-off valve 16 is closed. In other embodiments, the water restriction mechanism may utilize other designs, such as a poppet, to allow gas to flow but restrict the flow of water into the gas purging valve 10.

In operation, a gas purging valve 10 is installed in a FPS system by a qualified technician. Based on the size of the FPS, the size and capacity of a nitrogen generator attached to the FPS, and in conformance with applicable guidelines (e.g., National Fire Protection Association), the technician determines the optimal continuous gas flow rate, and sets the adjustable orifice 36 to achieve it, with reference to the gas flow meter 38. In one embodiment, the adjustable orifice 36 comprises a calibrated orifice having a fixed, predetermined flow rate. The calibrated orifice is removeably disposed in the gas purging valve 10, such as in a threaded chamber. In this embodiment, the technician determines the optimal gas flow rate, removes an existing calibrated orifice if one is installed in the gas purging valve 10, selects a calibrated orifice having the desired gas flow rate, and installs the selected calibrated orifice into the gas purging valve 10.

Nitrogen gas providing supervisory pressure in the FPS is then bled off at a controlled rate, and periodically replenished by intermittent (i.e. pressure-driven) operation of a nitrogen generator. Oxygen that off-gases from O2 dissolved in residual water trapped in the pipes is thus removed, and cannot accumulate to provide an environment conducive to galvanic or MIC corrosion. Additionally, due to the low dew point of nitrogen, the residual water itself will evaporate into water vapor, which will also be gradually removed as the nitrogen gas in the FPS is replenished.

In one embodiment, the outlet 28 is threaded and is operative to accept a gas purity analyzer (not shown), which provides an output indicating the purity of nitrogen gas exiting the gas purging valve 10. In one embodiment, the gas purity analyzer comprises an oxygen sensor, from which the purity of nitrogen gas may be inferred by the absence of detected oxygen. In one embodiment, the gas purity analyzer may output a visual indication. In another embodiment, the gas purity analyzer outputs a signal, which may be transmitted via a wired or wireless connection to a monitor or controller. In one embodiment, the controller may comprise a dedicated physical facilities control system, which may combine HVAC monitoring and control, fire and intrusion detection and response, access control, and similar functions.

Figure 7:
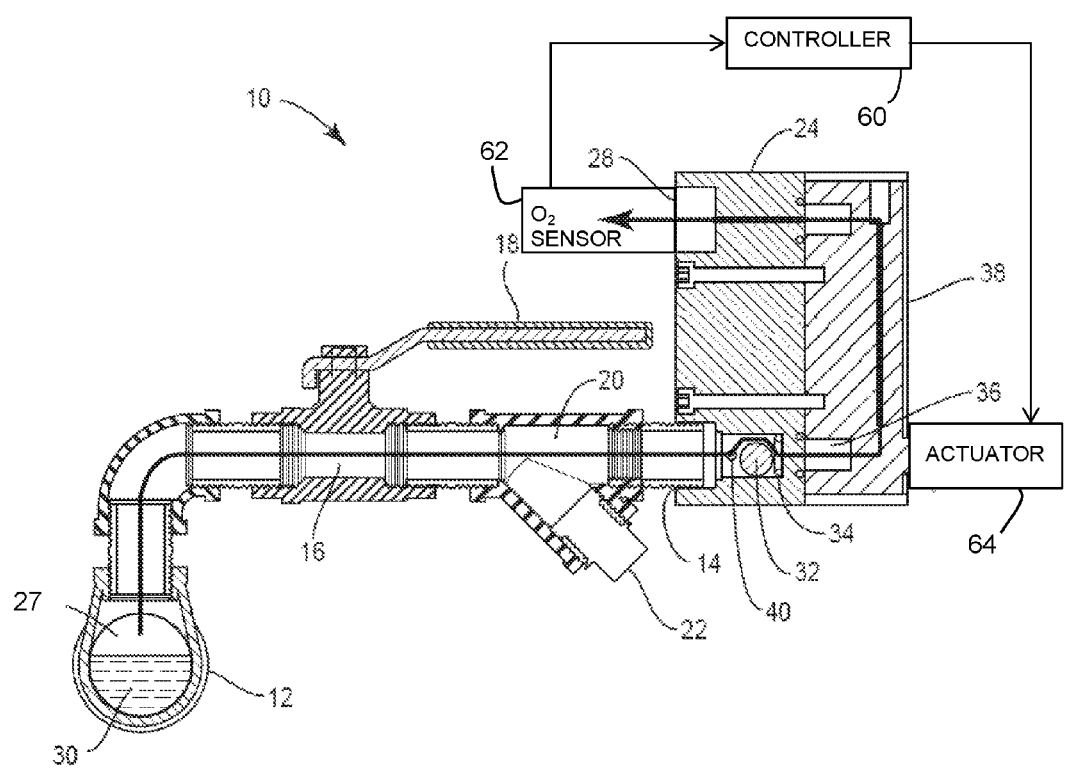
FIG. 7 is a section view of the gas purging valve of FIG. 3, with block diagrams indicating elements of a control system.

In some embodiments, the adjustable orifice 36 may comprise an electro-mechanical device, such as a needle valve actuated by a servo motor. In one embodiment, a plurality of buttons may be provided on the exterior of the gas purging valve 10 housing, with each button corresponding to a predetermined gas flow rate. In another embodiment, a keypad on the gas purging valve 10 may accept a user-input gas flow rate, and the servo motor controls the needle valve to achieve the selected flow rate. FIG. 7 depicts an embodiment of the gas purging valve 10 in which a controller 60, which may for example comprise an appropriately-programmed microprocessor, controls operation of the valve 10. A gas purity analyzer, such as an oxygen sensor 62, is affixed to the outlet 28, and senses the $O_2$ concentration gas exiting the valve 10. In response to the, e.g., oxygen sensor 62, the controller 60 controls an actuator 64, which adjusts the adjustable orifice 36. For example, the controller 60 may control the actuator 64 to restrict or cease gas flow when the $O_2$ sensor 62 resorts a sufficiently low level of $O_2$ (indicating a high purity of $N_2$ gas). In one embodiment, the O2 sensor additionally measures the gas flow rate exiting the outlet 28, and the controller 60 controls the actuator 64 to adjust the adjustable orifice 36 so as to maintain a desired gas flow rate through the gas purging valve 10.

In some embodiments, the gas flow meter 38 may also comprise an electro-mechanical transducer, generating an analog or digital output signal. In these embodiments, a controller such as a microprocessor may be programmed to control the adjustable orifice 36 in response to the gas flow meter 38 output, so as to maintain a predetermined gas flow rate through the gas purging valve 10.

In some embodiments, a gas purity analyzer generating an analog or digital output may be attached to the outlet 28, and the controller may implement a closed-loop control system, controlling the adjustable orifice 36 in response to the gas purity analyzer output so as to maintain a predetermined purity of gas in the FPS pipes 12. In some embodiments, the gas purity analyzer signal may control an inner loop of a control system, with the gas flow meter 38 output controlling an outer loop, so that the gas purging flow rate does not exceed NFPA standards. In one embodiment, the controller may be a physical facilities control system, as described above. In another embodiment, the controller may be dedicated to controlling operation of the gas purging valve 10. In one embodiment, a dedicated controller may be integrated into the gas purging valve 10. In another embodiment, the controller may be located remotely, with wireless connections to the adjustable orifice 36, gas flow meter 38, and gas purity analyzer.

Figure 5:
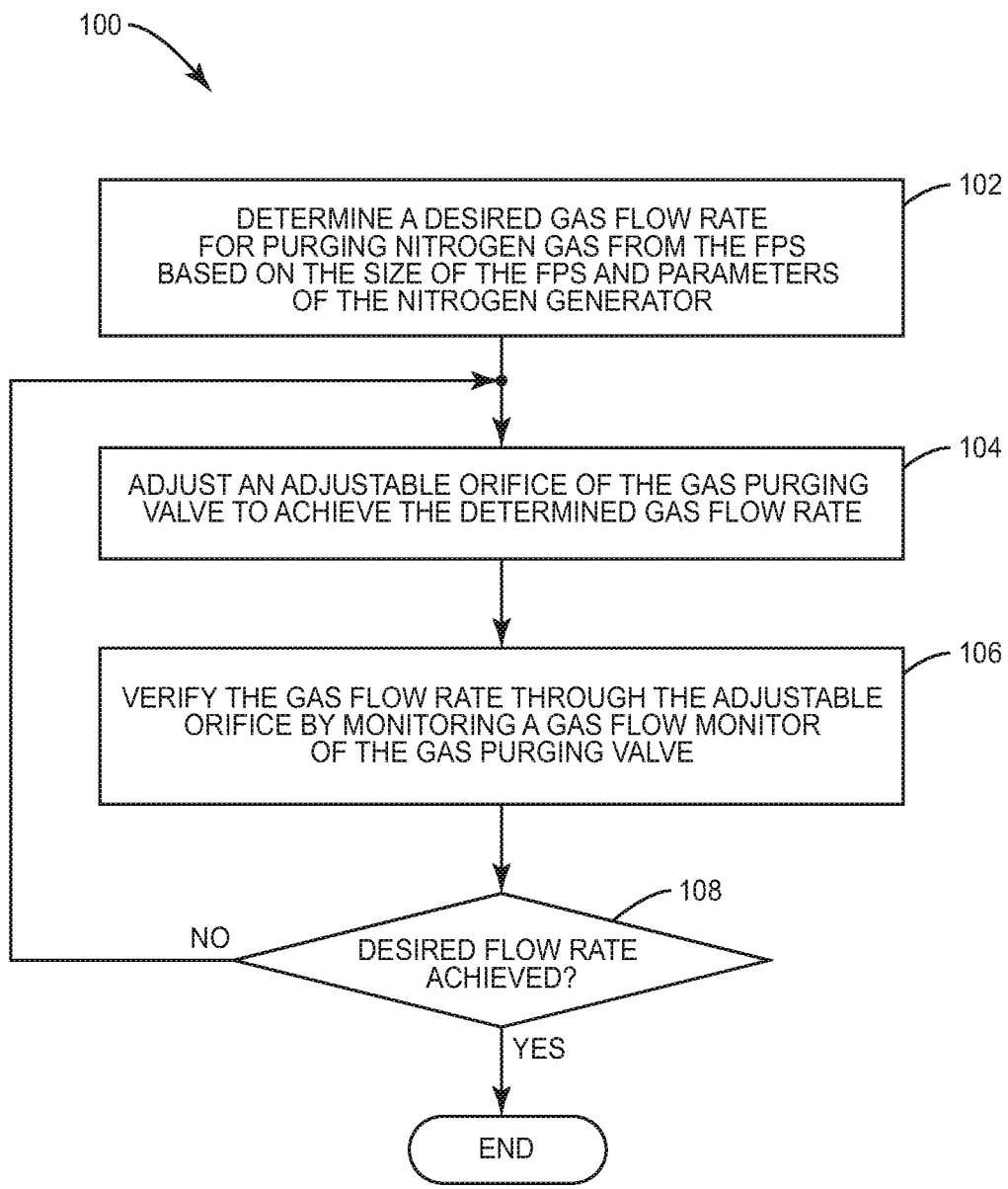
FIG. 5 is a flow diagram of a method of operating a dry or pre-action FPS.

FIG. 5 depicts the steps in a method 100 of operating a dry or pre-action FPS having a nitrogen generator and a gas purging valve 10 connected thereto. A desired gas flow rate for purging nitrogen gas from the FPS is determined based on at least the size of the FPS and parameters of the nitrogen generator, and possibly other factors (block 102). An adjustable orifice 36 of the gas purging valve 10 is then adjusted to achieve the determined gas flow rate (block 104). Finally, the gas flow rate through the adjustable orifice is verified by monitoring a gas flow monitor 38 of the gas purging valve 10 (block 106). The last two steps (blocks 104, 106) may be iterative. If the gas flow rate observed from the gas flow monitor 38 is not the desired flow rate (block 108), then further adjustment of the adjustable orifice 36 may be required.

Figure 6:
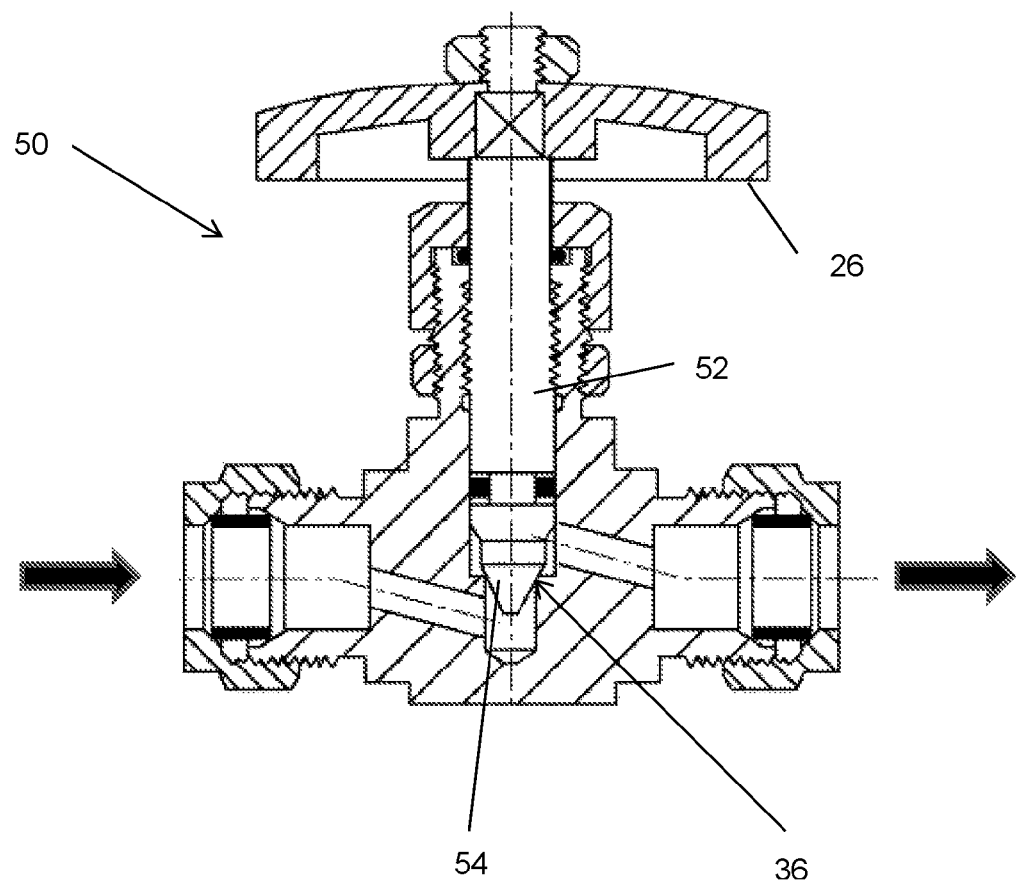
FIG. 6 is a section view of a prior art needle valve, as well known in the art.

Needle valves are well known in the art. For example, FIG. 6 depicts one representative needle valve 50. Fluid flow is indicated by large arrows (although the flow could be in the opposite direction). Needle valve 50 includes an adjustable orifice 36, and a flow rate adjustment knob 26 operative to alter the flow rate of fluid through the adjustable orifice 36. For example, a shaft 52 may be attached to the adjustment knob 26. The shaft 52 terminates in a tapered, conical shape, referred to the art as a needle 54. The shaft 52 is threadedly disposed within the needle valve 50. Turning the adjustment knob 26 either advances the needle 52 into the adjustable orifice 36, thus restricting the flow of fluid, or retracts the needle 52 from the adjustable orifice 36, thus increasing the flow of fluid.

Embodiments of the present invention present numerous advantages over the prior art of simply replacing the air in a dry or pre-action FPS with nitrogen gas. By continuously purging nitrogen gas at a predetermined rate, the nitrogen in the FPS pipes is gradually flushed and renewed. The nitrogen gas that is bled off carries with it residual oxygen, as well as oxygen that may have out-gassed from O2 dissolved in residual water remaining in the pipes after hydro-testing. The residual water itself is also eventually removed, as the water evaporates due to the low dew point of nitrogen, and the water vapor is purged from the pipes. Gas purging valves 10 according to embodiments described herein facilitate this process by providing an easy "set it and forget it" solution to establishing a known nitrogen gas bleed rate. The adjustable orifice 36 of the gas purging valves allows a single gas purging valve 10 (and, in one embodiment, an assortment of replaceable, fixed, calibrated orifices) to be applied to any FPS. The gas flow monitor 38 provides immediate feedback of the gas flow rate through the adjustable orifice 36, and allows the proper gas flow rate to be achieved quickly and easily. In embodiments wherein one or both of the adjustable orifice 36 and gas flow monitor 38 are electro-mechanical, a controller may automate the process. In embodiments where a gas purity monitor is attached to the outlet 28, a closed-loop control system may adjust the adjustable orifice 36 to achieve a predetermined level of purity of nitrogen gas in the FPS.

Although described herein with respect to nitrogen gas, those of skill in the art will readily recognize that embodiments of the present invention are not so limited. The gas purging valve 10 described herein may be applied to control the bleed rate of any gas used to provide supervisory pressure in a dry or pre-action FPS, including air, nitrogen, or other gases.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A gas purging valve operative to be connected to piping in a Fire Protection System (FPS) and to bleed gas from the FPS piping at an adjustable rate, comprising:
   an inlet in gas flow relationship with the FPS piping and operative to receive pressurized gas from the FPS piping;
   an adjustable orifice operative to allow an adjustable maximum positive gas flow rate therethrough;
   a gas flow monitor operative to measure the positive rate of gas flow through the adjustable orifice;
   an outlet operative to discharge gas from the gas purging valve to the atmosphere; and
   a water restriction mechanism disposed upstream of the adjustable orifice, the water restriction mechanism operative to allow gas flow through the gas purging valve but operative to impede the flow of water through the gas purging valve.

2. The valve of claim 1 wherein the gas flow monitor comprises a visual indication of gas flow rate.

3. The valve of claim 2 wherein the gas flow monitor comprises a Thorpe tube flowmeter.

4. The valve of claim 1 wherein the gas flow monitor comprises a transducer operative to output a signal indicating the gas flow rate.

5. The valve of claim 1 wherein the adjustable orifice comprises a calibrated orifice removeably disposed within the gas purging valve, and wherein the maximum gas flow rate is adjusted by removing a first calibrated orifice having a first flow rate and replacing it with a second calibrated orifice having a second flow rate.

6. The valve of claim 1 wherein the adjustable orifice comprises a gas flow rate adjustment knob, and wherein a gas flow rate through the adjustable orifice changes between positive values in response to manual adjustments to the gas flow rate adjustment knob.

7. The valve of claim 6 wherein the adjustable orifice comprises a needle valve and wherein the gas flow rate adjustment knob controls the gas flow rate through the needle valve.

8. The valve of claim 1 wherein the adjustable orifice comprises an automatic gas flow rate valve operative to change the gas flow rate therethrough in response to a control signal.

9. The valve of claim 1 wherein the water restriction mechanism comprises a ball disposed upstream of the adjustable orifice and gas flow monitor.

10. The valve of claim 9 wherein the water restriction mechanism further comprises an o-ring sized and positioned such that water pressure at the inlet urges the ball against the o-ring, sealing the gas purging valve against water flow therethrough.

11. The valve of claim 10 wherein the ball and the o-ring are disposed in the inlet.

12. The valve of claim 1 further comprising a gas purity analyzer connected to the outlet.

13. The valve of claim 12 wherein the gas purity analyzer comprises an oxygen sensor.

14. The valve of claim 1 wherein the adjustable orifice and gas flow monitor are automatic, and further comprising a controller operative to monitor the gas flow rate output by the gas flow monitor, and further operative to control the adjustable orifice in response to the monitored gas flow rate, so as to maintain a predetermined gas flow rate through the gas purging valve.

15. The valve of claim 14, further comprising a gas purity analyzer connected to the outlet, and wherein the controller is further operative to control the adjustable orifice in response to the gas purity analyzer output, so as to maintain a predetermined purity of gas in the FPS piping.

16. A method of operating a dry or pre-action Fire Protection System (FPS) having a nitrogen generator and a gas purging valve connected thereto, comprising:
   determining a desired positive gas flow rate for purging nitrogen gas from the FPS based on the size of the FPS and parameters of the nitrogen generator;

adjusting an adjustable orifice of the gas purging valve to achieve the determined positive gas flow rate; and verifying the positive gas flow rate through the adjustable orifice by monitoring a gas flow monitor of the gas purging valve.

17. The method of claim 16, wherein adjusting the adjustable orifice of the gas purging valve comprises installing a calibrated orifice having a desired fixed gas flow rate into the gas purging valve.

18. The method of claim 16, wherein adjusting the adjustable orifice of the gas purging valve comprises adjusting a needle valve while observing the gas flow monitor.

19. The method of claim 16, wherein adjusting the adjustable orifice of the gas purging valve comprises accepting a selection of one of a plurality of predetermined positive gas flow rates, and adjusting a needle valve via a servo motor in response to the selection.

20. The method of claim 16, wherein adjusting the adjustable orifice of the gas purging valve comprises accepting entry of a desired positive gas flow rate on a keypad of the gas purging valve, and adjusting a needle valve via a servo motor in response to the entered rate.

* * * * *